(12) United States Patent
Tsuchiya et al.

(10) Patent No.: US 10,800,585 B2
(45) Date of Patent: Oct. 13, 2020

(54) MANUFACTURING METHOD FOR METAL CAP

(71) Applicant: NIPPON CLOSURES CO., LTD., Tokyo (JP)

(72) Inventors: Kouichi Tsuchiya, Kanagawa (JP); Mitsuo Kumata, Kanagawa (JP); Yusuke Okubo, Kanagawa (JP)

(73) Assignee: NIPPON CLOSURES CO., LTD., Tokyo (JP)

( * ) Notice: Subject to any disclaimer, the term of this patent is extended or adjusted under 35 U.S.C. 154(b) by 563 days.

(21) Appl. No.: 15/318,161

(22) PCT Filed: Jun. 24, 2015

(86) PCT No.: PCT/JP2015/068128
§ 371 (c)(1),
(2) Date: Dec. 12, 2016

(87) PCT Pub. No.: WO2015/199110
PCT Pub. Date: Dec. 30, 2015

(65) Prior Publication Data
US 2017/0137188 A1     May 18, 2017

(30) Foreign Application Priority Data

Jun. 27, 2014  (JP) ................................. 2014-132289
Mar. 16, 2015  (JP) ................................. 2015-052003

(51) Int. Cl.
*B29C 43/18*     (2006.01)
*B65D 41/04*     (2006.01)
(Continued)

(52) U.S. Cl.
CPC ............. *B65D 53/06* (2013.01); *B21D 51/50* (2013.01); *B29C 43/003* (2013.01);
(Continued)

(58) Field of Classification Search
CPC ..................................................... B29C 43/18
See application file for complete search history.

(56) References Cited

U.S. PATENT DOCUMENTS 3,749,272 A   7/1973  Brockett et al.
5,769,255 A   6/1998  Ohmi et al.
(Continued)

FOREIGN PATENT DOCUMENTS

CN         1119983     4/1996
CN       101148208     3/2008
(Continued)

OTHER PUBLICATIONS

International Search Report issued in Patent Application No. PCT/JP2015/068128, dated Oct. 6, 2015.
(Continued)

*Primary Examiner* — Matthew J Daniels
*Assistant Examiner* — Patrick Butler
(74) *Attorney, Agent, or Firm* — Greenblum & Bernstein, P.L.C.

(57) ABSTRACT

A metal cap in which a linear to be held to a cap body and separable from the cap body can be formed by a series of operations for forming the cap body and press molding the liner. The liner of the metal cap has a double-layer structure including a barrier layer on a top panel wall side and a sealing layer on the inner side of the cap body, and the barrier layer is temporarily bonded to the top panel wall with a weak adhesive at the time of molding the barrier layer and separated from the top panel wall by the natural cooling of the barrier layer after molding.

7 Claims, 8 Drawing Sheets

(51) Int. Cl.
  *B65D 41/34* (2006.01)
  *B65D 41/32* (2006.01)
  *B65D 53/06* (2006.01)
  *B29C 43/14* (2006.01)
  *B21D 51/50* (2006.01)
  *B29C 43/00* (2006.01)
  *B29K 21/00* (2006.01)
  *B29K 23/00* (2006.01)
  *B29K 705/00* (2006.01)
  *B29L 31/26* (2006.01)
  *B29L 31/56* (2006.01)

(52) U.S. Cl.
  CPC ............ *B29C 43/146* (2013.01); *B29C 43/18* (2013.01); *B65D 41/0428* (2013.01); *B65D 41/325* (2013.01); *B65D 41/348* (2013.01); *B29C 2043/185* (2013.01); *B29K 2021/003* (2013.01); *B29K 2023/12* (2013.01); *B29K 2705/00* (2013.01); *B29L 2031/26* (2013.01); *B29L 2031/565* (2013.01)

(56) References Cited

U.S. PATENT DOCUMENTS

| | | | |
|---|---|---|---|
| 6,840,898 | B2 | 1/2005 | Pettersson |
| 7,314,589 | B2 | 1/2008 | Parrinello |
| 2008/0073309 | A1 | 3/2008 | Nakajima et al. |
| 2008/0105685 | A1* | 5/2008 | Parrinello ............. B29C 43/146 220/378 |
| 2010/0065528 | A1* | 3/2010 | Hanafusa ............. B65D 41/045 215/347 |
| 2013/0056436 | A1 | 3/2013 | Muto et al. |

FOREIGN PATENT DOCUMENTS

| | | |
|---|---|---|
| CN | 101891031 | 11/2010 |
| CN | 102892684 | 1/2013 |
| JP | 02-243327 | 9/1990 |
| JP | 2004-123216 | 4/2004 |
| JP | 2008-050031 | 3/2008 |
| JP | 2009-078842 | 4/2009 |
| JP | 4585126 | 11/2010 |
| JP | 2011-240937 | 12/2011 |
| JP | 2013-189254 | 9/2013 |
| JP | 2014-114055 | 6/2014 |
| JP | 2015-003325 | 1/2015 |
| JP | 2015-003737 | 1/2015 |

OTHER PUBLICATIONS

Extended European Search Report in respect to European Application No. 15812197.0, dated Jan. 31, 2018.
Chinese Office Action issued in Patent Appl. No. 201580033897.0, dated Sep. 22, 2017.

* cited by examiner

MANUFACTURING METHOD FOR METAL CAP

TECHNICAL FIELD

The present invention relates to a metal cap equipped with a liner having high sealability and openability and to a manufacturing method therefor.

BACKGROUND ART

As a cap to be attached to the mouth-neck section of a beverage container formed from a metal, a synthetic resin such as polyethylene terephthalate or glass, a metal cap comprising a cap body which has a circular top panel wall and a cylindrical skirt wall extending downwardly from the peripheral edge of this top panel wall and is formed from a thin metal plate such as a thin aluminum alloy plate, a thin chromic acid treated steel plate or a thin tin plate is widely used.

A liner molded from a synthetic resin such as polypropylene is formed on the inner surface of the top panel wall of the cap body.

This metal cap is fitted onto a mouth-neck section after a container is filled with contents and, while the liner is pressed against the mouth-neck section to seal the mouth-neck section, female threads are formed in the main part of the skirt wall along the male threads of the mouth-neck section and the lower end part of the skirt wall is deformed inwardly in a radial direction to be locked to an annular jaw section, thereby attaching the metal cap to the mouth-neck section so as to seal the mouth-neck section.

PRIOR ART DOCUMENTS

Patent Documents

Patent Document 1: Japanese Patent No. 4585126
Patent Document 2: JP-A 2013-189254

DISCLOSURE OF THE INVENTION

Problem to be Solved by the Invention

Openability and sealability are required as the performances of a cap. A liner made of a synthetic resin such as polypropylene is used to seal the mouth-neck section of a container. In general, when sealability is improved, openability is impaired, making opening difficult and initial opening torque high right before rotation. On the other hand, when openability is improved to make it easy to open, sealing force is lost. Therefore, both properties are incompatible with each other.

According to Patent Document 1, a circular thin metal plate-like reinforcing member is disposed on the inner surface of the top panel wall of the cap body of a metal cap, a synthetic resin liner is press-molded on one side of the reinforcing member, the reinforcing member is disposed on the top panel wall side without being bonded to the top panel wall, and the liner is brought into contact with the mouth-neck section of a container. Therefore, the sealability of the mouth-neck section is kept by the synthetic resin liner, and the inner surface of the top panel wall and the metal reinforcing plate are made unbonded to each other at the time of opening, thereby reducing the friction force of a contact surface between the top panel wall and the metal reinforcing plate to lighten opening force.

According to Patent Document 2, a synthetic resin liner is disposed on the inner surface of the top panel wall of the cap body of a metal cap. This synthetic resin liner is composed of multiple layers including a hard sheet made of polypropylene formed in contact with the inner surface of the top panel wall and a soft layer formed on one side of the hard sheet by molding a resin. This liner is disposed without bonding the hard sheet to the top panel wall and brings the soft layer into contact with the mouth-neck section of a container. Therefore, the sealability of the mouth-neck section is kept by the soft layer, thereby reducing the friction force of a contact surface between the inner surface of the top panel wall and the hard sheet at the time of opening to lighten opening force.

However, since the circular thin metal plate-like reinforcing member is used, the metal cap of Patent Document 1 has a problem that the cost is higher than that of a cap having a liner formed only from a synthetic resin. Further, a setting step for inserting the reinforcing member used to mold the liner into the inside of the cap body is added to a series of production steps such as the forming of the cap body and the press-molding of the liner.

Also, in the metal cap of Patent Document 2, the liner including the hard sheet and the soft layer must be inserted into the inside of the cap body later, thereby adding the setting step besides the molding steps.

It is an object of the present invention which was made in view of the above situation to provide a metal cap in which a liner to be held to a cap body can be molded by a series of operations for forming the cap body and press-molding the liner while it is separated from (not adhered to) the cap body as well as a manufacturing method therefor.

Means for Solving the Problem

To attain the above object, there is provided a metal cap equipped with a liner, comprising a cap body having a circular top panel wall and a cylindrical skirt wall extending downwardly from the peripheral edge of the top panel wall and a synthetic resin liner disposed on the inner surface of the top panel wall, in which a liner holding portion protruding outwardly in a radial direction and holding the edge part of the liner is formed in the skirt wall, wherein the liner has a double-layer structure consisting of a barrier layer on the top panel wall side of the metal cap and an sealing layer on the inner side, both of which are formed by press molding a molten resin for forming a liner supplied into the cap body, a coating layer for making the barrier layer unbonded to the inner surface of the cap body is formed on the inner surface of the cap body, and a molten resin rolling prevention means is disposed on the surface of the coating layer on the top panel wall to lock a molten barrier resin to the top panel wall temporarily at the time of molding the barrier layer.

Preferably, the above rolling prevention means of the above metal cap is formed in the center part of the inner surface of the top panel wall.

Preferably, the above rolling prevention means is a separable weak adhesive and the barrier layer.

The above barrier layer of the above metal cap can be formed from polypropylene and the above sealing layer can be formed from an elastomer.

A holding protrusion protruding inwardly from the above skirt wall and holding the liner on the inner peripheral surface is formed at the lower end of the above liner holding portion of the above metal cap, and inwardly protruding portions protruding more inwardly in the radial direction of the cap body than the holding protrusion can be formed below the holding protrusion.

Further, to attain the above object, a metal cap molding method of the present invention in which a molten resin for forming a liner is supplied into a cap body of the metal cap comprising a cap body having a circular top panel wall and a cylindrical skirt wall extending downwardly from the peripheral edge of the top panel wall to form a synthetic resin liner having a barrier layer and a sealing layer by press molding, and the synthetic resin liner is held to a liner holding portion formed in the skirt wall, comprises the steps of:

forming a coating layer which makes the inner surface of the cap body unbonded to the barrier layer on the inner surface of the cap body;

coating a weak adhesive for locking the barrier layer temporarily to the inner surface of the coating layer;

placing the molten resin for forming the barrier layer on the top panel wall with the weak adhesive therebetween to mold the barrier layer; and placing the molten resin for forming the sealing layer on the surface of the barrier layer to mold the sealing layer after the step of molding the barrier layer.

In the above metal cap molding method, inwardly protruding portions protruding more inwardly than the above liner holding portion are formed in proximity to the lower part of the above liner holding portion, and this step of forming the inwardly protruding portions may come between the step of molding the above barrier layer and the step of molding the above sealing layer.

In the above metal cap molding method, inwardly protruding portions protruding more inwardly than the above liner holding portion are formed in proximity to the lower part of the above liner holding portion, and this step of forming the inwardly protruding portions may come after the step of molding the above sealing layer.

In the above metal cap molding method, the molten resin for forming the above barrier layer can be molded to ensure that it is filled in the above holding portion in the step of molding the above barrier layer.

Effect of the Invention

According to the present invention, a metal cap in which a molten resin can be molded into a liner to be held to a cap body in the cap body by a series of operations for forming the cap body and press molding the liner, that is, without pressing the liner into the cap body in another step though the liner is not bonded to the cap body can be manufactured.

As compared with a method for manufacturing a metal cap in which a resin liner is molded on a thin metal plate and a hard sheet, the manufacturing method of the present invention can cut production cost and can make opening torque smaller than that of a metal cap in which a liner is bonded to a cap body.

BRIEF DESCRIPTION OF THE DRAWINGS

FIG. 5 show the molding procedure of the barrier layer of the metal cap shown in FIG. 1, wherein FIG. 5A is a sectional view showing that a barrier material is placed on the top panel wall, FIG. 5B is a sectional view showing that the barrier material is spread by compression molding, and FIG. 5C is a sectional view showing that the barrier material is molded into a barrier layer by compression molding;

FIG. 6 show the molding procedure of the sealing layer of the metal cap shown in FIG. 1, wherein FIG. 6A is a sectional view showing that a sealing material is placed on the barrier material on the top panel wall, FIG. 6B is a sectional view showing that the sealing material is spread by compression molding, and FIG. 6C is a sectional view showing that the sealing material is molded into a sealing layer by compression molding;

FIG. 10 show the molding procedure of the liner of the metal cap shown in FIG. 9, wherein FIG. 10(A) is a sectional view showing that a cap body is molded, FIG. 10(B) is a sectional view showing that a barrier layer is molded on the cap body shown in FIG. 10(A), FIG. 10(C) is a sectional view showing that inwardly protruding portions are formed on the cap body shown in FIG. 10(B), and FIG. 10(D) is a sectional view showing that a sealing layer is molded on the surface of the barrier layer formed in FIG. 10(C)

BEST MODE FOR CARRYING OUT THE INVENTION

A method for manufacturing a metal cap according to a first embodiment of the present invention will be described in detail with reference to the accompanying drawings.

Figure 1:
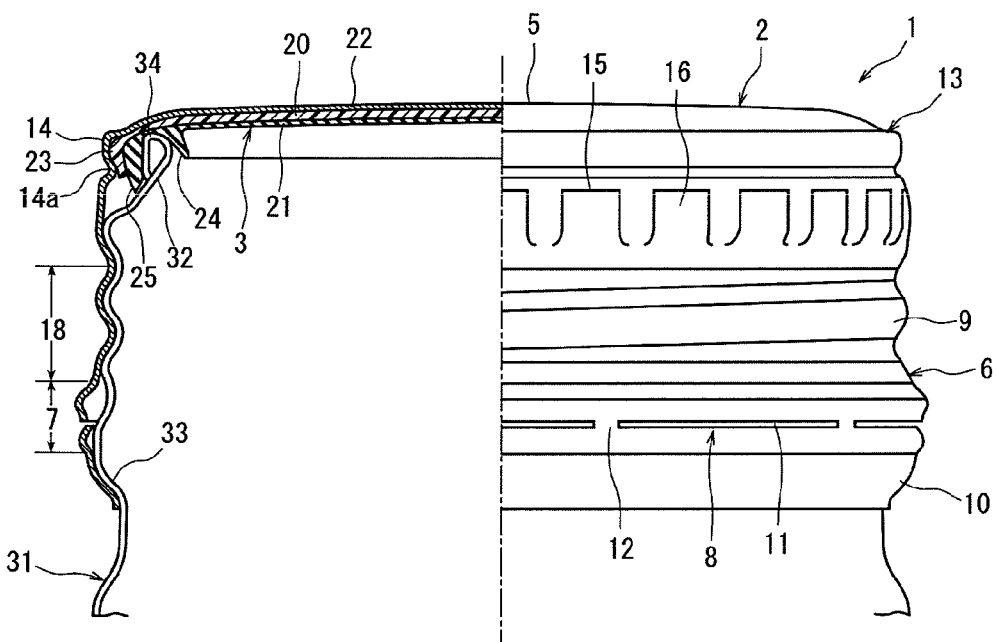
FIG. 1 is a partially broken front view of a metal cap according to a first embodiment of the present invention.

With reference to FIG. 1, a description is given of the metal cap of the present invention. The metal cap 1 comprises a cap body 2 and a liner 3. The cap body 2 has a circular top panel wall 5 and a cylindrical skirt wall 6 extending downwardly from the peripheral edge of the top panel wall 5. An annular bulging-out portion 7 which somewhat bulges outwardly in a radial direction is formed in the lower part of the skirt wall 6. A breakage line 8 is formed in a circumferential direction in the center part in the axial direction of the annular bulging-out portion 7. The skirt wall 6 is sectioned into a main part 9 above the breakage line 8 and a tamper evident band 10 below the breakage line 8. The breakage line 8 is composed of a plurality of slits 11 extending in the circumferential direction at circumferentially spaced intervals and a plurality of bridge portions 12 which are located between adjacent slits 11 and can be broken.

A liner holding portion 14 for holding the liner 3 is formed at the upper end of the skirt wall 6. The liner holding portion 14 protrudes arcuately and outwardly in the radial direction, and inwardly protruding portions 16 (see FIG. 3) are formed below the liner holding portion 14 by protruding an area below cutting lines 15 engraved in the circumferential direction inwardly in the radial direction. The cutting lines 15 at the upper ends of the inwardly protruding portions 16 serve as openings 17 (see FIG. 3) extending substantially horizontally. The openings 17 are formed to flow washing water onto the outer peripheral surface of the mouth-neck section of a container. A thread forming area 18 is existent in the main part 9 of the skirt wall below the inwardly protruding portions 16.

Figure 2:
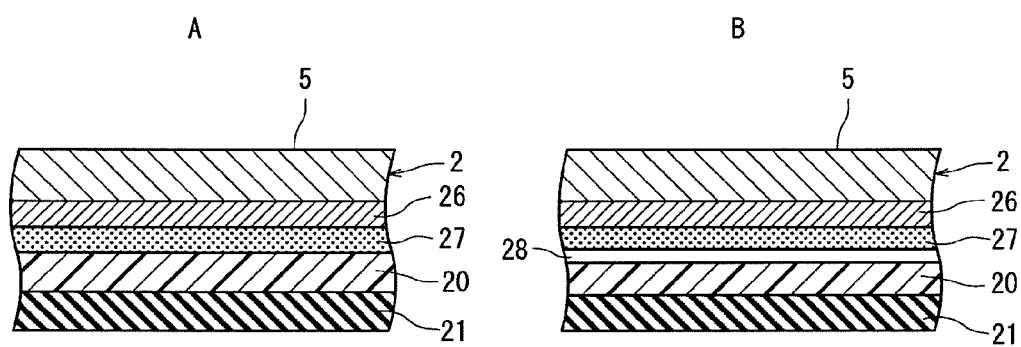
FIG. 2A is an enlarged sectional view of the top panel wall of the metal cap shown in FIG. 1 at the time of molding and FIG. 2B is an enlarged sectional view after molding.

A coating layer 26 is formed on the inner surface of the top panel wall 5 of the cap body 2 (see FIG. 2).

A container 31 to be covered with the metal cap 1 is a metal container, and a curled portion 34 which is curled outwardly in the radial direction with an almost circular cross section is formed at the upper end of the mouth-neck section 32. A jaw section 33 whose lower part is curved inwardly in the radial direction is formed below the mouth-neck section 32, and the lower end of the tamper evident band 10 is locked to the jaw section 33.

The liner 3 in this embodiment has a double-layer structure consisting of a barrier layer 20 located on the top panel wall 5 side and a sealing layer 21 formed on the surface of the barrier layer 20 on a side opposite to the top panel wall 5.

In this embodiment, the barrier layer 20 is formed from polypropylene as the main component, the sealing layer 21 is formed from an elastomer as the main component, and these two layers are integrated with each other.

The barrier layer 20 has a circular shape as a whole corresponding to the top panel wall 5 and is composed of a thin disk portion 22 on the central side and a peripheral protruding portion 23 on the peripheral side. The peripheral protruding portion 23 is ring-shaped and has an almost arc cross section along the inner surface of the liner holding portion 14 of the cap body 2, and the lower end part thereof protrudes more downwardly than the surface on the inner peripheral side of the barrier layer 20. It is important that the outer diameter of the barrier layer 20 should be smaller than the maximum outer diameter of the liner holding portion 14 and larger than the inner diameter of a holding protrusion 14a (see FIG. 4) in the lower part of the liner holding portion 14.

The sealing layer 21 is molded on the under surface of the barrier layer 20 and integrated with the barrier layer 20. The sealing layer 21 has an outer diameter which is smaller than the outer diameter of the barrier layer 20 and includes an inner annular seal 24 located on the inner peripheral side of the mouth-neck section 32 of the container 31 and an outer annular seal 25 located on the outer peripheral side of the mouth-neck section 32. These inner and outer annular seals 24 and 25 protrude downwardly before the cap body 2 is fastened (see FIG. 3). After the cap body 2 is fastened, the seals 24 and 25 come into close contact with the curled portion 34.

Figure 3:
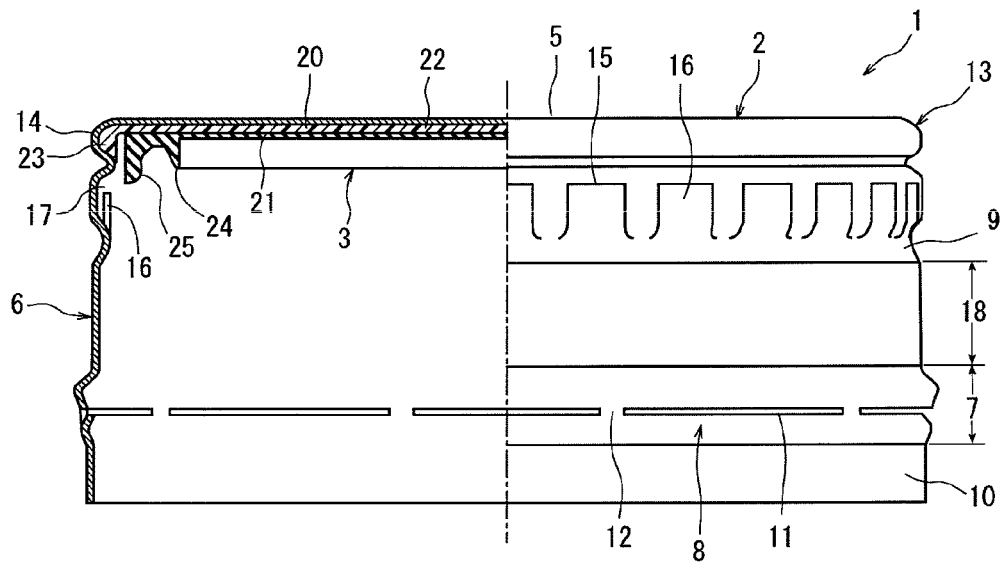
FIG. 3 is a partially broken front view of the metal cap shown in FIG. 1 before fastening.

The liner 3 of the present invention is disposed on the top panel wall 5 without being bonded to the top panel wall 5 before the cap body 2 is fastened after the liner 3 shown in FIG. 3 is molded. The reason that the liner 3 (the concrete manufacturing method will be described hereinafter) becomes unbonded to the top panel wall 5 after molding is that the liner 3 is separated from a weak adhesive 27 by shrinkage caused by the natural cooling of the liner 3, thereby forming a small space 28 (see FIG. 2B) between the liner 3 and the liner holding portion 14.

Therefore, the liner 3 is in contact with the top panel wall 5 but not bonded to the top panel wall 5 after the molding of the liner 3 as the space 28 is physically formed as described above, the peripheral protruding portion 23 is held to the liner holding portion 14, and the liner 3 is stored in the cap body 2. When the cap body 2 is not attached to the mouth-neck section 32 of the container 31, the liner 3 can rotate relative to the top panel wall 5. Right after the cap body 2 is attached to the mouth-neck section 32 and opened, the cap body 2 rotates relative to the liner 3 but not relative to the mouth-neck section 32 of the container 31. Along with opening, the liner 3 becomes free from the cap body 2 and the mouth-neck section 32, the peripheral protruding portion 23 is raised by the holding protrusion 14a, and the liner 3 is separated from the mouth-neck section 32.

Thus, the metal cap 1 can be opened without rotating the liner 3 relative to the mouth-neck section 32 having large sealing force. Therefore, the sealing force of the liner 3 can be made large.

A description is subsequently given of the procedure of manufacturing the liner of the metal cap of the present invention with reference to FIGS. 4 to 6. The shape of the cap body 2 shown in FIGS. 4 to 6 differs from the shape of the cap body 2 after fastening shown in FIG. 1 since the metal cap 1 is not fastened.

As the metal cap in this embodiment, a metal cap made of a conventionally known metal material such as a surface treated steel plate or an aluminum light metal plate may be advantageously used. A resin coated metal plate produced by applying a coating agent to this metal material may also be used.

Figure 4:
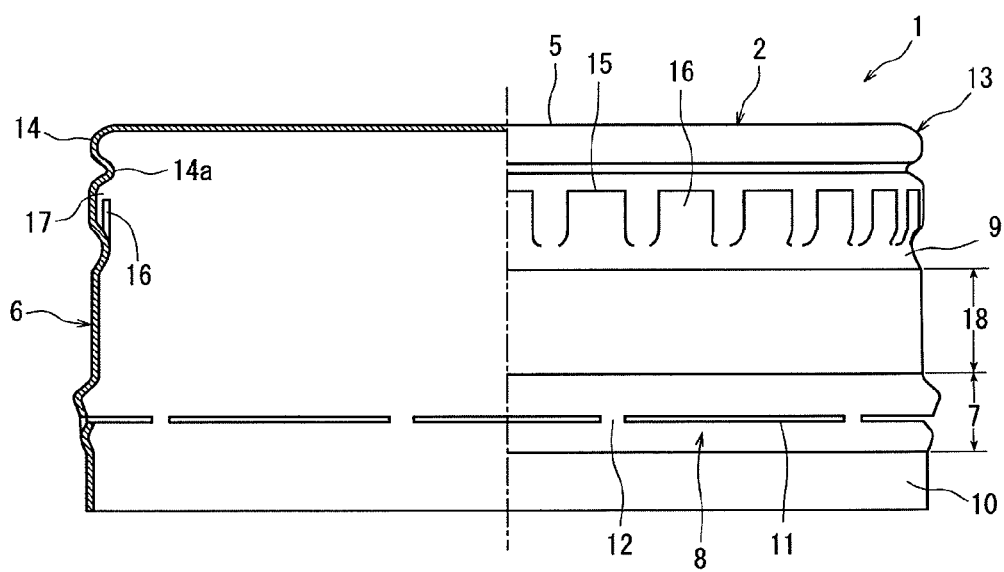
FIG. 4 is a partially broken front view of the metal cap shown in FIG. 1 before the molding of a liner.

In this embodiment, as shown in FIG. 2, a metal plate having a coating layer 26 on the inner surface at a site where at least the barrier layer 20 is to be formed and further a weak adhesive 27 applied to the coating layer 26 is prepared and then punched and press formed into a cap form to obtain the metal cap 1 shown in FIG. 4. As a matter of course, the coating agent and the weak adhesive may be applied after the cap body 2 is molded. As the coating agent, a thermoplastic resin film comprising epoxy phenol, polyester or polyester phenol amide as the main component may be used.

For the weak adhesive, a solvent such as alkyd-based resin, petroleum-based hydrocarbon or alkyl benzene may be used. A weak adhesive comprising 1 to 18 wt %, preferably 1 to 10 wt % of a polypropylene adhesive component based on the solvent may be used. The particle diameter of the above adhesive component is preferably 6 to 22 μm.

[Structure of Barrier Layer Forming Mold]

Figure 5:
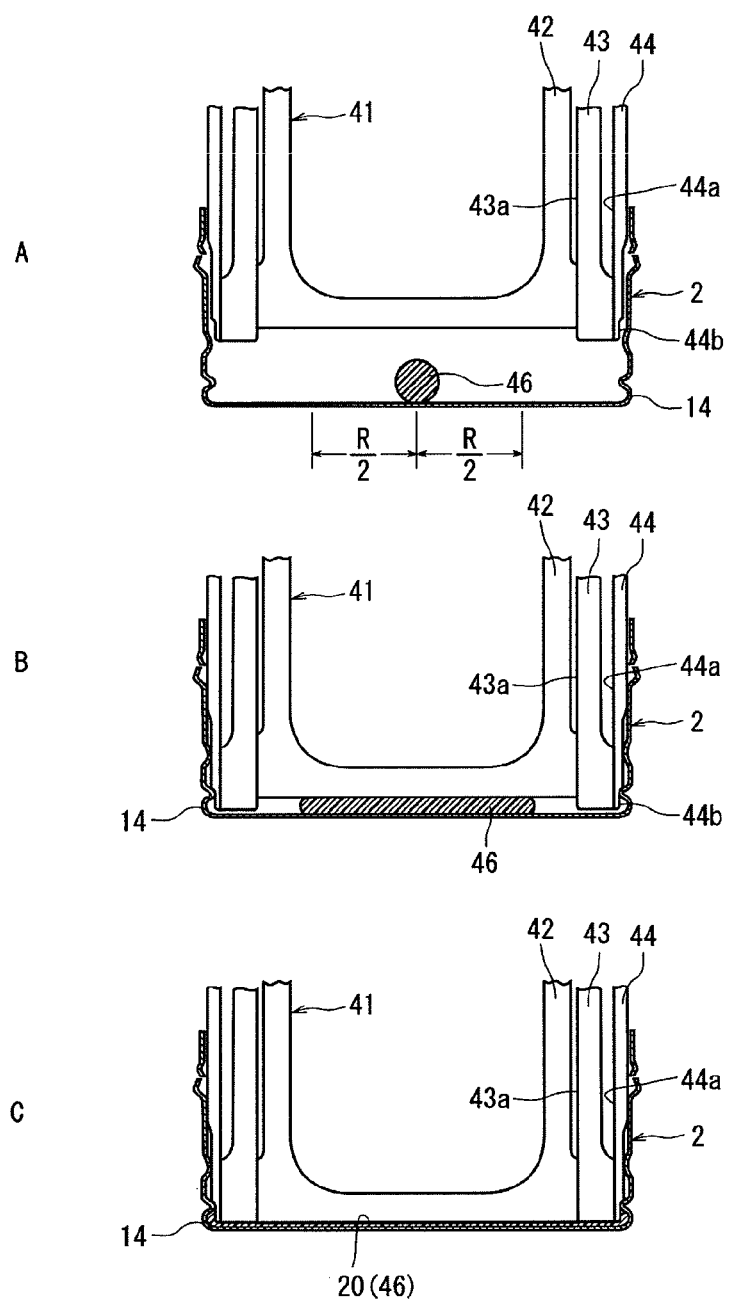
Figure 6:
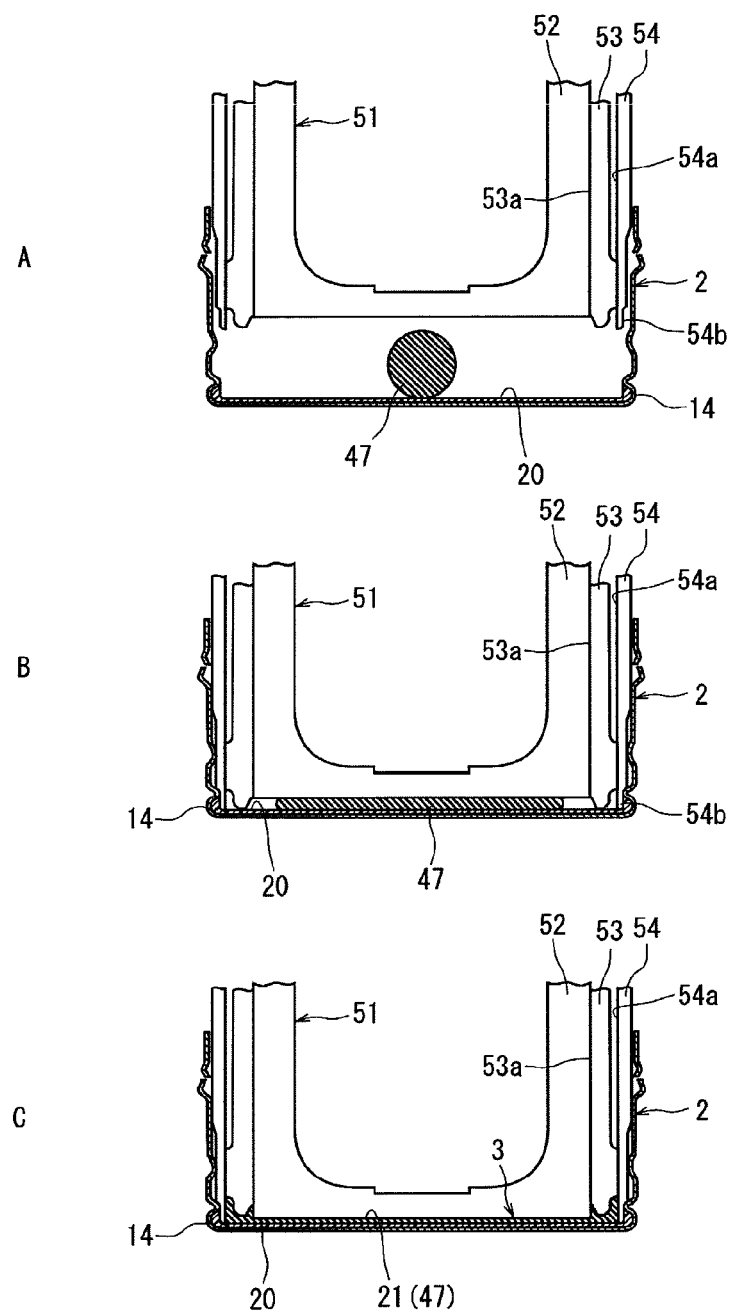

With reference to FIG. 5, a first molding tool 41 for molding the barrier layer of the liner 3 has a metal central punch 42, a metal intermediate pressing sleeve 43 and a metal peripheral sleeve 43. The cap body 2 is arranged with the top panel wall 5 facing down. The liner holding portion 14, the holding protrusion 14a and the inwardly protruding portions 16 are formed in the cap body 2 in advance.

The cylindrical bottomed central punch 42 is fitted to the inner peripheral surface 43a of the intermediate pressing sleeve 43 in such a matter that it can move relative to the intermediate pressing sleeve 43 in the axial direction. The cylindrical intermediate pressing sleeve 43 is mounted to the inner peripheral surface 44a of the peripheral sleeve 44, and the cylindrical peripheral sleeve 44 is disposed to face the inner wall of the cap body 2. The intermediate pressing sleeve 43 can move relative to the peripheral sleeve 44 in the axial direction. A tapered surface having a smaller diameter toward the end is formed on the outer peripheral surface of the end part 44b of the peripheral sleeve 44 to come into contact with the inner surface of the holding protrusion 14a (see FIG. 4) of the liner holding portion 14 without a space therebetween. The end surfaces of the central punch 42 and the sleeves 43 and 44 are formed flat so that they become parallel to the inner surface of the top panel wall 5.

[Molding of Barrier Layer]

To mold the barrier layer 20 of the liner 3, the weak adhesive 27 is applied to the surface of the coating layer 26 of the cap body 2.

The weak adhesive 27 serves to prevent a barrier material 46 which is the material of the barrier layer 20 from moving until the barrier material 46 is pressed by the central punch 42, and an area to which the weak adhesive 27 is applied becomes R/2 or more in the direction of the radius R of the top panel wall from the center as shown in FIG. 5A. This is determined from an area of the inner surface of the cap body 2 on which a molten resin block is to be dropped before press molding. The weak adhesive does not need to be applied to the entire inner surface of the top panel wall 5. In this embodiment, as the weak adhesive 27, an adhesive containing 1 to 10% of a polypropylene adhesive component in an alkyd-based resin solvent is used.

The molten barrier material 46 is mounted on the weak adhesive 27 toward the center of the top panel wall 5 at the time of molding. The weak adhesive 27 has such adhesive force that the cap body 2 can hold the barrier material 46 while moving. A rolling prevention means should prevent the rolling of the supplied barrier material 46 in the cap body moved by rotation and may be, for example, a locking means such as a friction material or a fine protrusion formed on the inner surface of the top panel wall of the cap body besides the weak adhesive.

Figure 7:
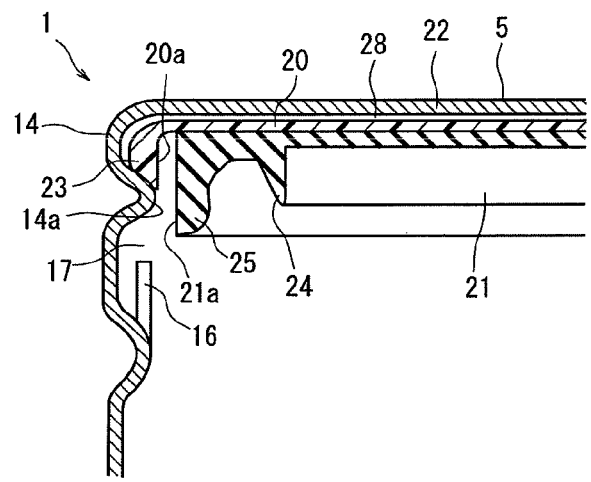
FIG. 7 is an enlarged sectional view of the liner holding portion of the metal cap shown in FIG. 1.

The intermediate pressing sleeve 43 and the peripheral sleeve 44 are lowered so as to form a space having the same size as the thickness of the barrier layer 20 between the end surfaces of these sleeves 43 and 44 and the top panel wall 5. Then, the central punch 42 is lowered to compression mold the barrier material 46. The barrier material 46 spreads out in the radial direction as the central punch 42 is lowered, and when the central punch 42 is lowered to the same position as the sleeves 43 and 44, the barrier material 46 spreads up to the liner holding portion 14 of the top panel wall 5 and fills up to the outer peripheral side of the peripheral sleeve 44 to form the disk portion 22 and the peripheral protruding portion 23 of the barrier layer 20. The outer peripheral surface of the peripheral protruding portion 23 is formed along the inner peripheral surface of the liner holding portion 14. An annular vertical surface 20a extending downwardly from the disk portion 22 is formed on the inner peripheral side of the peripheral protruding portion 23 (see FIG. 7).

At this point, the barrier material 46 is bonded to the inner surface of the top panel wall 5 through the coating layer 26 by the weak adhesive 27. The barrier material 46 is bonded to the weak adhesive 27 with weak adhesive force but not to the coating layer 26. Therefore, the barrier layer 20 formed from the barrier material 46 is connected to the top panel wall 5 at a site where the weak adhesive 27 is existent but not connected by the adhesive at a site where the weak adhesive 27 is not applied though it is in contact with the top panel wall 5.

After the molding of the barrier layer 20, the central punch 42, the intermediate pressing sleeve 43 and the peripheral sleeve 44 are lifted up and separated from the cap body 2.

[Structure of Sealing Layer Forming Mold]

A second molding tool 51 for molding the sealing layer 21 of the liner 3 has a metal central punch 52, a metal intermediate pressing sleeve 53 and a metal peripheral sleeve 54. The cylindrical bottomed central punch 52 is fitted to the inner peripheral surface 53a of the intermediate pressing sleeve 53 in such a manner that it can move relative to the intermediate pressing sleeve 53 in the axial direction. The cylindrical intermediate pressing sleeve 53 is mounted to the inner peripheral surface 54a of the peripheral sleeve 54, and the cylindrical peripheral sleeve 54 is disposed to face the inner wall of the cap body 2. The intermediate pressing sleeve 53 can move relative to the peripheral sleeve 54 in the axial direction, and the end part 53b thereof is shaped to form an inner surface between the inner and outer annular seals 24 and 25 of the sealing layer 21. The peripheral sleeve 54 has an inner peripheral surface 54a fitted to the intermediate pressing sleeve 53 in such a manner that it can move relative to the sleeve 53 in the axial direction, and a tapered surface having a smaller diameter toward the end is formed on the outer peripheral surface of the end part 54b thereof to come into contact with the inner surface of the holding protrusion 14a (see FIG. 4) of the liner holding portion 14 without a space therebetween.

[Molding of Sealing Layer]

To mold the sealing layer 21 of the liner 3, a sealing material 47 is placed in the center of the surface of the barrier layer 20 molded above the top panel wall 5 of the cap body 2. The sealing material 47 comprises an elastomer as the main component.

At the time of molding the sealing layer 21, a molten sealing material 47 is mounted on the barrier layer 20 toward the center of the top panel wall 5. Then, the intermediate pressing sleeve 53 and the peripheral sleeve 54 are lowered. These sleeves 53 and 54 are lowered up to the surface of the barrier layer 20, and the outer peripheral surface of the end part 54b of the peripheral sleeve 54 comes into contact with the inner peripheral surface of the peripheral protruding portion 23 of the barrier layer 20.

When the central punch 52 is lowered, the sealing material 47 spreads out in the radial direction, and the intermediate pressing sleeve 53 is raised a little at this point to form a space between the end part 54b and the barrier layer 20 so as to fill the sealing material 47 up to the inner peripheral surface of the peripheral sleeve 54. The disk portion 22 of the sealing layer 21 is formed on the central punch 52 side, and the inner and outer annular seals 24 and 25 are formed on the intermediate pressing sleeve 53 side. An annular vertical surface 21a extending downwardly from the peripheral edge of the sealing layer 21 is formed on the outer annular seal 25, and the vertical surface 21a is formed on the inner side of the vertical surface 20a of the barrier layer 20 with a space therebetween (see FIG. 7).

The barrier layer 20 and the sealing layer 21 are connected to each other without an adhesive.

The liner 3 having the barrier layer 20 and the sealing layer 21 is thus molded. After the molding of the sealing layer 21, the central punch 52, the intermediate pressing sleeve 53 and the peripheral sleeve 54 are lifted up and separated from the cap body 2.

Although the liner 3 formed by the continuous molding of the barrier layer 20 and the sealing layer 21 is kept at a high temperature during molding, after molding, the temperature of the liner 3 is reduced by natural cooling in a normal-temperature environment (air). Polypropylene and the elastomer shrink by cooling, and the barrier layer 20 bonded to the inner surface of the top panel wall 5 through the coating layer 26 shrinks eventually.

In general, at the time of molding, adhesive force is large as a liner is continuously bonded to the thin-plate surface of a top panel wall or an inside plug (refer to Patent Document 1) after molding. In this embodiment, at the time of molding, the barrier layer 20 is bonded to the top panel wall 5 through the coating layer 26, and the weak adhesive 27 which peels off after molding is used to limit the adhesion time.

That is, the coating layer 26 is made of a material which adheres to an adhesive but hardly adheres to propylene forming the barrier layer 20, and a material having weaker adhesive force than an ordinary adhesive is used as the weak adhesive 27. When the liner 3 (especially the barrier layer 20) shrinks, the weak adhesive 27 peels off from the barrier layer 20 in defiance of the adhesive force of the weak adhesive 27. Then, as there is no bonding relationship between the liner 3 and the top panel wall 5 and the liner 3 shrinks, a very small space 28 is physically formed the liner holding portion 14 (see FIG. 7).

Due to this space, the liner 3 can rotate relative to the cap body 2 in the circumferential direction, and the cap body 2 can move slightly in the diameter direction. Even after the shrinkage of the liner 3 by which the space 28 has been formed, the outer diameter of the liner 3 is larger than the minimum inner diameter of the holding protrusion 14a of the liner holding portion 14. Therefore, in a natural condition (no load), the outer peripheral part of the liner 3 is locked to the holding protrusion 14a by forming the holding protrusion 14a so that the liner 3 does not fall off from the liner holding portion 14.

Thus, in the present invention, the liner holding portion 14 is formed in advance at the time of forming the cap body 2, and the cap body 2 is separated from the liner 3 by using a separable adhesive at the time of molding the liner 3. The liner 3 which is separate from the metal cap 2 can be held in the metal cap 2 only by a series of operations for forming the cap body 2 and the liner 3. Therefore, a setting step for inserting the liner into the metal cap is not required.

FIG. 3 shows the metal cap 1 comprising the cap body 2 and the liner 3 after molding and before fastening. Therefore, at this point, threads are not formed in the thread forming area of the metal cap 1. To fasten the metal cap 1 to the mouth-neck section 32 of the container, the metal cap 1 is covered on the mouth-neck section 32. In this state, the inner annular seal 24 of the above-described liner 3 is disposed on the inner wall at the upper end of the mouth-neck section 32, the outer annular seal 25 is disposed on the outer wall, and the mouth-neck section 32 is positioned between these annular seals 24 and 25.

In this state, fastening is carried out. That is, a shoulder portion 13 is deformed by a pressing tool (not shown) while the metal cap 1 covered on the mouth-neck section 32 is pressed against the upper end of the mouth-neck section 32 by the pressing tool, and threads corresponding to the mouth-neck section 32 are formed in the thread forming area of the skirt wall 6 by pressing a thread forming roller (not shown) against the skirt wall 6 of the cap body 2 and rolling it along the threads of the mouth-neck section 32.

At the same time, a tamper evident forming roller is pressed below the mouth-neck section to deform the lower end of the tamper evident band 10 of the cap body 2 along the lower side of the jaw section 3.

As shown in FIG. 1, the metal cap 1 after fastening is thus obtained and seals up the inside of the container 31.

Although the shoulder portion 13 of the metal cap 1 after fastening is deformed with the pressing tool as described above, at the time of the deformation of the shoulder portion 13, the peripheral protruding portion 23 and the inner and outer annular seals 24 and 25 of the liner 3 are pressed against the mouth-neck section 32, the peripheral protruding portion 23 is deformed inwardly by this fastening, the vertical surfaces 20a and 21a of the barrier layer 20 and the sealing layer 21 come into contact with each other, and the outer annular seal 25 is pressure deformed by the upper end opening curled portion 34 of the mouth-neck section 32, thereby sealing up the mouth-neck section 32. Meanwhile, the peripheral portion of the barrier layer 20 is pressed by the shoulder portion 13 of the cap body 2 to be brought into pressure contact with the shoulder portion 13 so that it cannot rotate relatively. However, the barrier layer 20 is not bonded by adhesion as described above.

Figure 8:
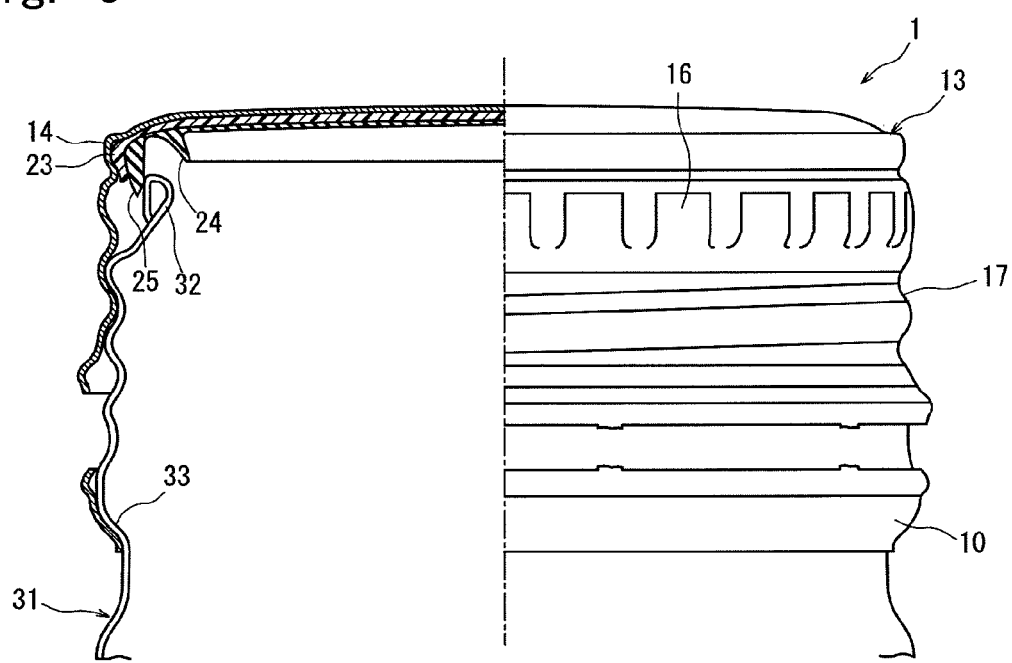
FIG. 8 is a partially broken front view showing that the cap shown in FIG. 1 is opened.

With reference to FIG. 8, at the time of opening the metal cap 1, the skirt wall 6 goes up and is removed from the mouth-neck section 32 by rotating the metal cap 1 in the opening direction. At this point, the lower end of the tamper evident band 10 is locked below the mouth-neck section 32, whereby its rise is restricted. As a result, the bridge portions 12 are broken, the tamper evident band 10 is separated from the skirt wall 6, and the metal cap 1 can be removed from the mouth-neck section 32.

Although the metal cap 1 rotates relative to the mouth-neck section 32 at the time of opening, the inner and outer annular seals 24 and 25 of the sealing layer 21 in contact with the mouth-neck section 32 come into close contact with the upper end of the mouth-neck section 32 by fastening. Meanwhile, the barrier layer 20 in contact with the inner surface side of the cap body 2 has smaller friction force than the close contact force of the seals 24 and 25 and is not bonded by means of an adhesive as described above.

Therefore, the liner 3 comes into close contact with the mouth-neck section 32 side and the cap body 2 rotates relative to the stationary liner 3 at the time of opening the cap body 2. The barrier layer 20 is made of polypropylene and has small friction force against the cap body 2 made of a metal such as aluminum, and the rotation of the liner 3 is prevented until the cap body 2 rotates. Until close contact force between the liner 3 and the mouth-neck section 32 is lost by the rise of the cap body 2, the co-rotation of the liner 3 and the cap body 2 is prevented. Thus, since the barrier layer 20 is not bonded to the top panel wall 5, even when the liner 3 increases its close contact force (sealability) with the mouth-neck section 32, its influence upon opening force becomes small.

The liner 3 does not remain on the mouth-neck section 32 even when the cap body 2 rises as the peripheral protruding portion 23 of the barrier layer 20 is held to the liner holding portion 14.

A description is subsequently given of a metal cap according to a second embodiment of the present invention. Constituent elements having the same names as those of the above first embodiment are given the same reference symbols.

In the above first embodiment, the holding protrusion 14a in the lower part of the liner holding portion 14 holds the liner 3 and raises the liner 3 at the time of opening. The holding protrusion 14a of the liner holding portion 14 may be deformed when the shoulder portion of the metal cap 1 is formed as understood with reference to the metal cap 1 after fastening shown in FIG. 1 with the result that the difference between the outer diameter of the liner 3 after shrinkage and the inner diameter (minimum diameter) of the holding protrusion 14a may become small. In other words, engagement between them may become weak.

In the second embodiment of the present invention, when the locking amount of the above holding protrusion 14a becomes small, at the time of opening the metal cap 1, the rise of the liner 3 by the holding protrusion 14a may become unsatisfactory. Even in this case, a metal cap capable of raising the liner 3 without fail is provided.

Figure 9:
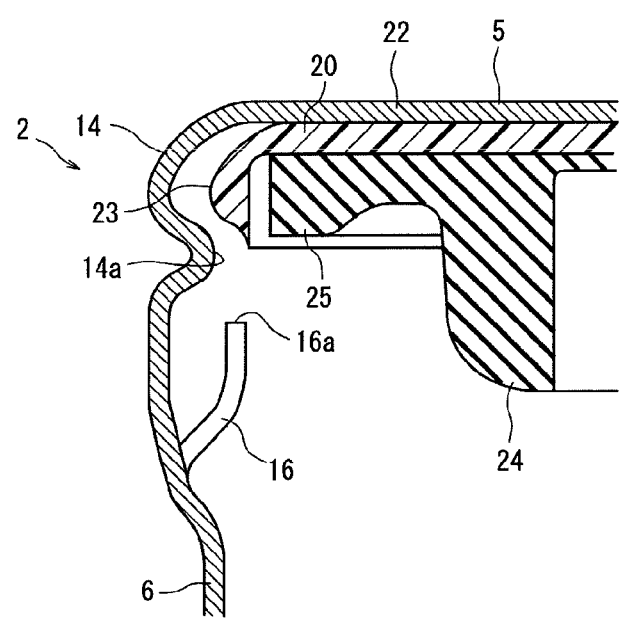
FIG. 9 is a sectional view of a boundary between the top panel wall and the skirt wall of a metal cap according to a second embodiment of the present invention.

FIG. 9 is an enlarged sectional view of a boundary between the top panel wall 5 and the skirt wall 6 of the metal cap 1. The metal cap 1 in this embodiment comprises a cap body 2 and a liner 3. The cap body 2 has a circular top panel wall 5 and a cylindrical skirt wall 6 extending downwardly from the peripheral edge of the top panel wall 5.

The cap body 2 differs from that of the first embodiment in the form of the inwardly protruding portions 16. Describing the inwardly protruding portions 16, they are formed by the cutting lines 15 engraved at circumferentially spaced intervals in the skirt wall 6. Areas below the cutting lines 15 are protruded inwardly in the radial direction to form a plurality of tongue-like protruding portions in the circumferential direction, and the cutting lines 15 at the upper ends substantially become the end parts 16a of the inwardly protruding portions 16. The end parts 16a are located in proximity to the lower part of the liner holding portion 14.

Further, the inwardly protruding portions 16 extend obliquely upwardly toward the inside in the radical direction of the cap body 2 from the base end side as shown in the cross-sectional form of FIG. 9, and the distal end sides extend in the vertical direction halfway. The end parts 16a of the inwardly protruding portions 16 protrude more inwardly in the radial direction than the holding protrusion 14a. All the end parts 16a of the inwardly protruding portions 16 do not need to protrude more inwardly than the holding protrusion 14a. For example, every one or every two or more of the end parts 16a may be protruded more inwardly than the holding protrusion 14a.

The liner 3 is composed of a barrier layer 20 on the top panel wall 5 side and a sealing layer 21 to be formed on the surface of the barrier layer 20, and the materials of the barrier layer 20 and the sealing layer 21 are the same as in the first embodiment. The shape of the barrier layer 20 is the same as in the above embodiment and peels off from the top panel wall 5 by shrinkage caused by natural cooling, and the peripheral protruding portion 23 thereof is held to the liner holding portion 14 of the cap body 2. The shape of the sealing layer 21 differs from that of the above first embodiment in that the height of the inner annular seal 24 is larger than the height of the outer annular seal 25 in this embodiment. The shape of the sealing layer 21 may be the same as that of the above first embodiment.

Thus, the inwardly protruding portions 16 are opened to form openings 17 for flowing washing water onto the peripheral surface of the mouth-neck section 32 of the container. In this embodiment, the inwardly protruding portions also have the auxiliary function of the liner holding portion in this embodiment.

That is, at the time of fastening the metal cap, the difference between the outer diameter of the liner 3 after shrinkage and the inner diameter (minimum diameter) of the holding protrusion 14a becomes small by deformation at the time of forming the shoulder portion of the cap. Even in this case, as the end parts 16a of the inwardly protruding portions 16 are located more inside than the minimum diameter part of the holding protrusion 14a, even when the rise of the liner 3 by the holding protrusion 14a becomes unsatisfactory at the time of opening the metal cap 1, the liner 3 is held and raised by the end parts 16a of the inwardly protruding portions 16 without fail. Therefore, inconvenience that the liner 3 remains in the mouth section of the container 31 is prevented.

Thus, according to this embodiment, the liner 3 can be stably held to the metal cap 1 without being separated at the time of opening.

A description is subsequently given of a method for molding the liner 3 on the inner surface of the top panel wall 5.

Figure 10:
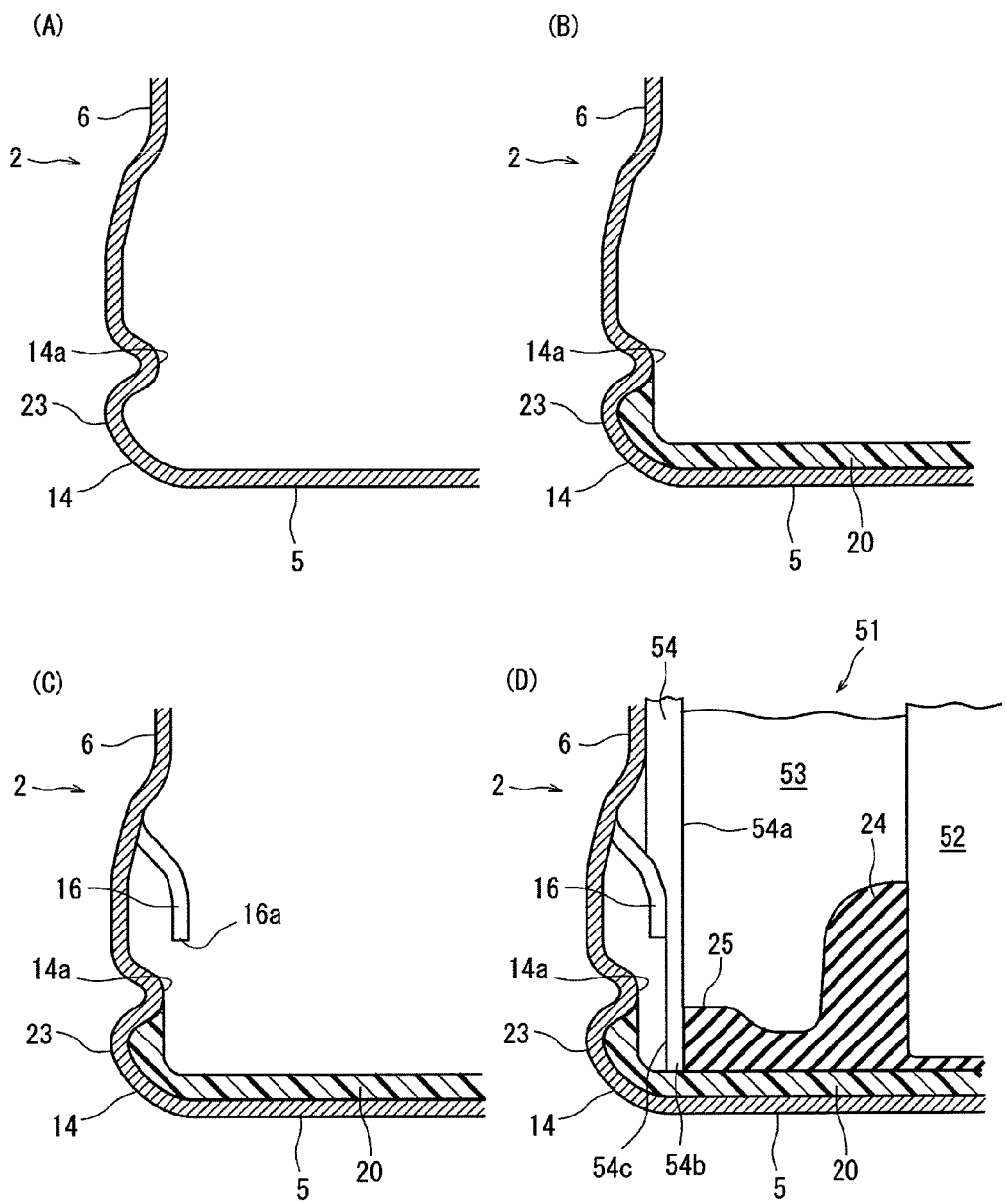

In the above first embodiment, as shown in FIG. 4, the cap body 2 having the cutting lines 15 and the inwardly protruding portions 16 is used. In contrast to this, in this second embodiment, as shown in FIG. 10(A), a cap body 2 having no cutting lines 15 and no inwardly protruding portions 16 is used. Then, as shown in FIG. 10(B), a barrier layer 20 is formed. The method for molding the barrier layer 20 is the same as the procedure shown in FIG. 5. The cap body to which the weak adhesive has been applied is used as in the first embodiment.

After the barrier layer 20 is formed, as shown in FIG. 10(C), the cutting lines 15 are formed with a cutter and areas below the cutting lines 15 of the skirt wall are press formed inwardly in the radial direction to form inwardly protruding portions 16. The amount of pressing is such that the end parts 16a of the inwardly protruding portions 16 enter more inside than the minimum diameter part of the holding protrusion 14a of the liner holding portion 14.

In the above first embodiment, after the cutting lines and the inwardly protruding portions are formed, the barrier layer is molded. However, when the inwardly protruding portions 16 are first formed as in the first embodiment, since the inwardly protruding portions 16 protrude more inwardly than the holding protrusion 14a, the inwardly protruding portions 16 interfere with the peripheral sleeve 44 by lowering the peripheral sleeve 44. Then, in this embodiment, after the barrier layer 20 is formed and before the sealing layer 21 is formed, the cutting lines 15 and the inwardly protruding portions 16 are formed.

After the inwardly protruding portions 16 are formed, the sealing layer 21 is then formed. With reference to FIG. 10(D), a second molding tool 51 for molding the sealing layer 21 of the liner 3 has a central punch 52, an intermediate pressing sleeve 53 and a peripheral sleeve 54 from the inner side toward the outer side.

Out of these, the peripheral sleeve 54 substantially differs from the peripheral sleeve of the above first embodiment. In the above first embodiment, the outer peripheral surface of the peripheral sleeve is brought into contact with the inner peripheral surface of the holding protrusion whereas in the second embodiment, the outer peripheral surface of the peripheral sleeve 54 is brought into contact with the inner side surfaces of the inwardly protruding portions 16.

That is, the outer peripheral surface 54c on the lower end side of the peripheral sleeve 54 is formed in contact with the inner side surfaces of the inwardly protruding portions 16, an upper part thereof is slightly curved along the inner side surfaces of the inwardly protruding portions 16, and a part above the inwardly protruding portions 16 extends along the inner surface of the skirt wall 6. The end surface of the end part 54b of the peripheral sleeve 54 is brought into contact with the surface of the barrier layer 20, and the inner peripheral surface 54a on the end side thereof serves as a dam for preventing the sealing material 47 (see FIG. 6) from leaking to the outer peripheral side of the peripheral sleeve 54 at the time of forming the sealing layer 21.

The end surface of the intermediate pressing sleeve 53 is formed corresponding to the surface shapes of the inner annular seal 24 and the outer annular seal 25, and the central punch 52 determines the thickness of the center part of the sealing layer 21. The barrier layer 20 and the sealing layer 21 are thus formed on the cap body 2.

Figure 11:
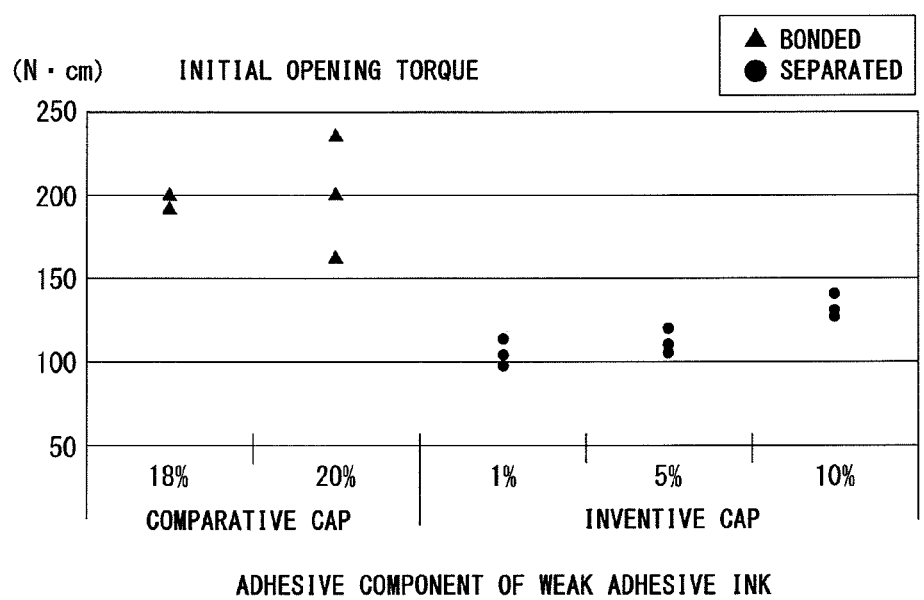
FIG. 11 is a chart showing test examples according to the embodiments of the present invention.

FIG. 11 shows the test results of opening force at the time of the first opening of the metal cap in this embodiment.

Initial opening torque (N-cm) after the metal cap is fastened is plotted on the vertical axis, and wt % of the propylene adhesive component based on the alkyd-based resin solvent is plotted on the horizontal axis.

The triangle in the chart shows that the liner is bonded to the cap body and cannot be separated from the cap body and the circle shows that the liner is separated from the cap body.

When the amount of the polypropylene adhesive component is less than 1 wt %, adhesive force is so weak that the barrier material 46 cannot be temporarily locked (temporarily fixed) at the time of molding. When the amount of the adhesive component is more than 18 wt %, the liner is not separated from the cap body and initial opening torque becomes extremely high. When the amount of the adhesive component is 1 to 10 wt %, the liner is separated without fail and appropriate initial opening torque is obtained. Therefore, this range is most preferred.

As described above, according to this embodiment, as compared with a cap in which a liner is molded on a thin metal plate, the cap can be manufactured at a low cost. As compared with a cap in which a liner is bonded to a cap body, opening torque can be made small. Although the liner 3 in this embodiment has a double-layer structure consisting of a polypropylene layer and an elastomer layer, as an elastomer having greater sealing force than polypropylene is used in the sealing portion, sealability can be improved.

Having described details of the invention based on the embodiments shown in the accompanying drawings, it is to be understood that the invention is not limited to the above embodiments and that various changes and modifications may be made in the invention without departing from the spirit and scope thereof.

In the above second embodiment, it has been explained that the step of forming the inwardly protruding portions 16 comes between the step of forming the barrier layer 20 and the step of forming the sealing layer 21. For example, after the barrier layer 20 and the sealing layer 21 are formed, the inwardly protruding portions 16 may be further formed. When the cutting lines 15 are formed at the same time as the molding of the inwardly protruding portions 16 by pressing, the cutting lines 15 are formed along with the molding of the inwardly protruding portions 16. When the formation of the cutting lines 15 is not accompanied by the molding of the inwardly protruding portions 16, the cutting lines 15 may be formed before the barrier layer 20 is formed.

Further, in the above first embodiment, the barrier layer 20 is formed after the inwardly protruding portions 16 are formed. As in the above second embodiment, the step of forming the inwardly protruding portions may be carried out between the step of molding the barrier layer and the step of molding the sealing layer, or the step of forming the inwardly protruding portions may be carried out after the step of molding the sealing layer.

Examples of the material of the coating agent, the material of the weak adhesive, the material of the barrier layer and the material of the close-contacting sheet are enumerated in the above embodiments but the invention is not limited thereto.

In the above embodiments, the weak adhesive is applied to the coating layer but may be applied to the barrier layer.

EXPLANATION OF REFERENCE SYMBOLS 1 metal cap
2 cap body
3 liner
5 top panel wall
6 skirt wall
13 shoulder portion
14 liner holding portion
14a holding protrusion
15 cutting line
16 inwardly protruding portion
20 barrier layer
21 sealing layer
23 peripheral protruding portion
24 inner annular seal
25 outer annular seal
26 coating layer
27 weak adhesive
31 container
32 mouth-neck section
33 jaw section
46 barrier material
47 sealing material

The invention claimed is:

1. A method for molding a metal cap in which a molten resin for forming a liner is supplied into a cap body of the metal cap comprising a cap body having a circular top panel wall and a cylindrical skirt wall extending downwardly from a peripheral edge of the top panel wall to form a synthetic resin liner having a barrier layer and a sealing layer by press molding, and the synthetic resin liner is held to a liner holding portion formed in the skirt wall, the method comprising:
forming a coating layer on an inner surface of the cap body;
coating a weak adhesive for locking the barrier layer temporarily to the inner surface of the coating layer;
molding the barrier layer by placing the molten resin on the top panel wall with the weak adhesive arranged between the top panel and the barrier layer such that during the molding of the barrier layer the weak adhesive serves to prevent the barrier layer from moving until the barrier layer is molded; and
molding the sealing layer by placing the molten resin for forming the sealing layer on a surface of the barrier layer so as to mold the sealing layer after molding the barrier layer,
wherein after shrinkage caused by natural cooling of the liner, the barrier layer peels off from the weak adhesive and the liner is not bonded to the top panel.

2. The method for molding a metal cap according to claim 1, further comprising:
forming inwardly protruding portions protruding more inwardly than the liner holding portion in proximity to a lower part of the liner holding portion.

3. The method for molding a metal cap according to claim 1, wherein the molten resin for forming the barrier layer is molded to ensure that it is filled in the liner holding portion in the step of molding the barrier layer.

4. The method for molding a metal cap according to claim 2, further comprising:
forming inwardly protruding portions after the molding the barrier layer and before the molding of the sealing layer.

5. The method for molding a metal cap according to claim 2, further comprising:
molding inwardly protruding portions after the molding of the sealing layer.

6. A method for making a metal cap having a synthetic resin liner made of molten resin, said metal cap having a cap body, a circular top panel wall, and a cylindrical skirt wall extending downwardly from a peripheral edge of the top panel wall, the method comprising;

applying a weak adhesive to a portion of a coated inside surface of the top panel wall;

after the applying, first press molding a molten resin over the inside surface of the top panel wall so as to form a barrier layer of the synthetic resin liner;

after the first press molding, second press molding a molten resin over the inside surface of the top panel wall so as to form a sealing layer of the synthetic resin liner, wherein the weak adhesive is structured and arranged to allow the barrier layer to peel off from the top panel wall upon shrinkage caused by natural cooling of the synthetic resin liner.

7. A method for making a metal cap having a synthetic resin liner made of molten resin, said metal cap having a cap body, a circular top panel wall, and a cylindrical skirt wall extending downwardly from a peripheral edge of the top panel wall, the method comprising;

applying a weak adhesive to a portion of an inside surface of the top panel wall;

after the applying, first press molding a molten resin over the inside surface of the top panel wall so as to form a barrier layer of the synthetic resin liner;

after the first press molding, second press molding a molten resin over an inside surface of the barrier layer so as to form a sealing layer of the synthetic resin liner, wherein the weak adhesive is structured and arranged to allow the barrier layer to separate from the top panel wall due to shrinkage caused by natural cooling of the synthetic resin liner and form a space between the top panel wall and the synthetic resin liner.

* * * * *